July 10, 1956  C. E. DEARDORFF ET AL  2,753,892
PISTON-SEALING STRUCTURE
Filed Aug. 31, 1953
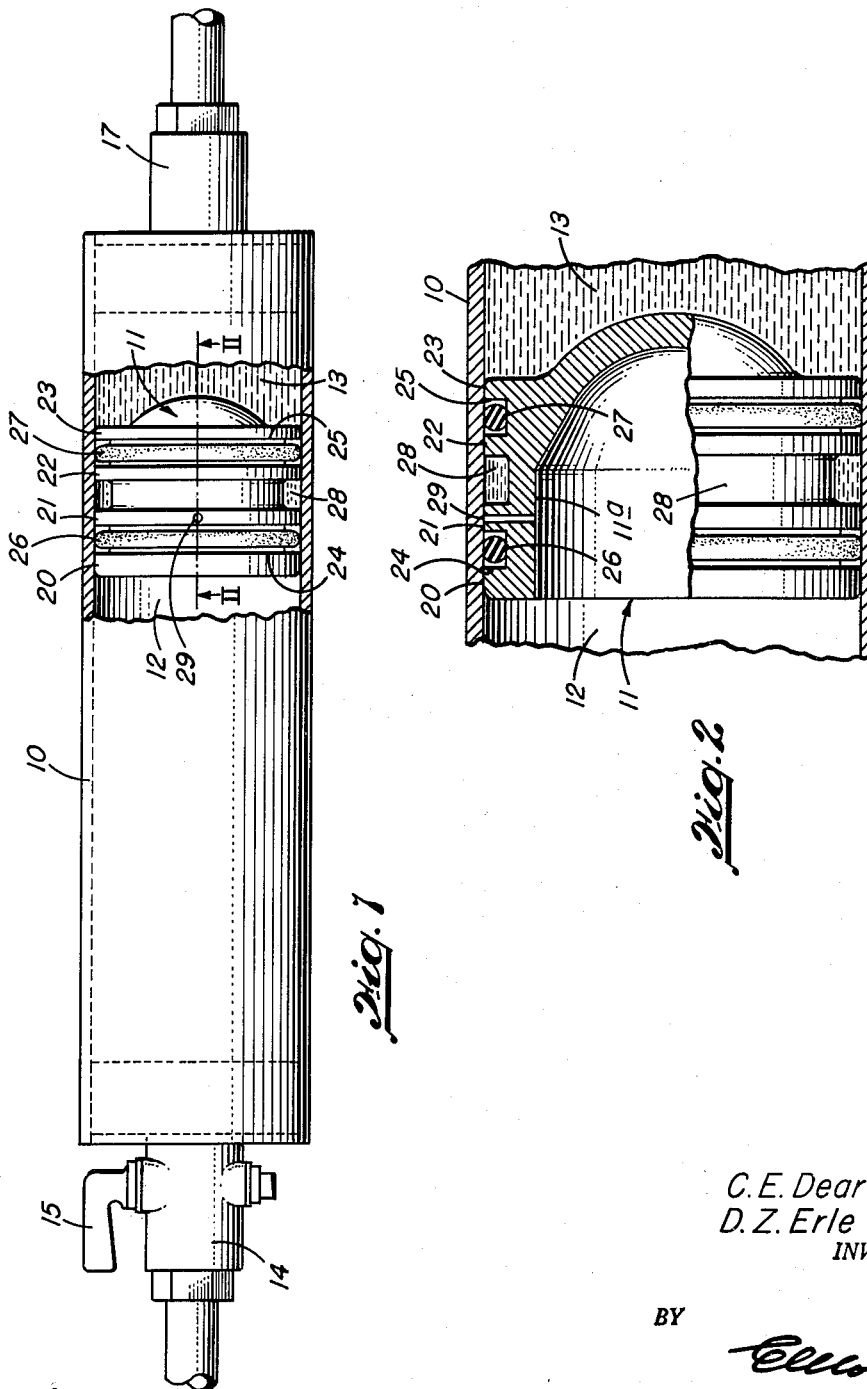
C. E. Deardorff
D. Z. Erle
   INVENTORS
BY
*Ellwoodbury*
ATTORNEY

2,753,892

PISTON-SEALING STRUCTURE

Clinton Edwin Deardorff, San Fernando, and Donald Z. Erle, Van Nuys, Calif., assignors to Bendix Aviation Corporation, North Hollywood, Calif., a corporation of Delaware Application August 31, 1953, Serial No. 377,488

4 Claims. (Cl. 138—31)

This invention relates to sealing structures for reciprocable members such as pistons, piston rods, etc., and is particularly useful, although not limited, to free pistons sealing between gas and liquid, as in hydraulic accumulators.

An object of the invention is to provide a practicable and inexpensive sealing structure that has low friction, leakage and wear.

A more specific object is to reduce the leakage of gas past a seal used to separate gas from liquid at variable, reversible differential pressures.

Other more specific objects and features of the invention will appear from the description to follow of a particular embodiment of the invention with reference to the drawing.

In the drawing:

Fig. 1 is a longitudinal view, partly in section and partly in elevation, showing a cylindrical accumulator having a piston provided with a seal in accordance with the invention.

Fig. 2 is an enlarged view of the piston and adjacent cylinder wall.

Referring to the drawing, there is shown a cylindrical accumulator comprising a cylinder 10 having a free piston 11 therein, separating a compressed gas chamber 12 in one end of the cylinder from a liquid (usually oil) chamber 13 in the other end. The chamber 12 is adapted to be filled with air or other gas at high pressure through a connection 14 containing a closure valve 15. It will be understood that the chamber 12 may be filled with air at a suitable pressure and the air then retained permanently in the cylinder by closing the valve 15, or the connection 14 can be connected to a reservoir containing the pressure air and the valve 15 left open. A connection 17 is provided at the right end of the cylinder for connecting the oil chamber 13 to a hydraulic system, the pressure of which is to be equalized. As is well known, when the pressure in the hydraulic system increases, the increased pressure in the oil chamber 13 moves the piston 11 to further compress the air in the chamber 12 and permit additional oil to enter the chamber 13 from the system. When the system pressure drops, the air in the chamber 12 expands to move the piston 11 to the right and supply additional pressure oil to the hydraulic system. Devices of the type so far described are broadly old and do not constitute any part of the present invention, the latter relating only to the sealing structure for the piston 11, which will now be described.

As most clearly shown in Fig. 2, the piston 11 is provided with first, second, third and fourth lands 20, 21, 22 and 23, reading from the air end of the piston toward the oil end. These four lands define two packing grooves 24 and 25 containing resilient packings 26 and 27, which may consist of rubber O-rings. A central groove 28 is defined by the two lands 21 and 22. In ordinary use, this groove 28 becomes more or less filled with oil from the oil compartment 13 of the accumulator and will be referred to as an oil groove. The essential novel feature of the present invention is a passage 29 which extends from the face 11a of the piston exposed to the air chamber 12 to that portion of the peripheral outer area of the piston between the packing rings 26 and 27. Preferably, this groove 29 is extended through the land 21, as shown.

The structure described functions as follows:

During normal operation of a cylinder type hydraulic accumulator, the piston functions merely to prevent mixing of the gas and liquid (air and oil, usually) and moves in response to any differential pressure sufficient to overcome its friction, so that the differential pressure tending to produce leakage is normally not very great. It is desirable to keep the friction low, so that the differential pressure is low. However, it not infrequently happens that the hydraulic pressure in the oil chamber 13 is reduced to a very low value, whereupon the piston 11 moves to the end of its stroke and bottoms against the right end of the cylinder. It is then exposed to the full air pressure in the chamber 12 on its air side and practically no pressure on the oil side. This has a strong tendency to produce leakage of air past the piston.

In the present invention, since the oil groove 28 is vented by the passage 29 to the air side of the piston, only the packing ring 27 at the oil end of the piston functions as a seal, but the second packing ring 26 functions as a cylinder-contacting element to reduce or prevent bearing contact between the piston and cylinder at the air end.

There is always some transfer of liquid past the packing ring 27 during reciprocation of the piston, because an ordinary packing so designed as not to have excessive friction does not wipe the cylinder dry, particularly when the differential pressure across it is low. Such leakage is necessary to the proper operation of an O-ring packing, since they do not function well in dry condition. This unavoidable leakage past the packing ring 27 accumulates in the oil groove 28 because of the wiping action of the second packing ring 26, and when the oil groove is filled, further oil escapes through the vent passage 29 into the air chamber. It is desirable to locate the vent in the bearing surface of the land 21 on the air side of the oil groove 28 to restrict the escape of oil from the groove while preventing development of thermal pressures therein. In an accumulator approximately three inches in diameter, the clearance between the piston lands and the cylinder wall may be from .002 to .006 inch, and the vent passage 29 may be a drilled hole approximately $\frac{1}{32}$ of an inch in diameter.

The presence of a body of oil in the oil groove 28 on the air side of the packing ring 27 reduces the possibility of air leakage into the hydraulic system when the piston bottoms and the air pressure greatly exceeds the oil pressure, because the oil forms a liquid barrier between the air and the ring. When provision is not made to trap oil on the air side of the packing ring 27, air is much more apt to leak past the packing ring and get into the hydraulic system when the accumulator piston bottoms as a result of a radical pressure drop in the hydraulic system.

It is to be understood that more than one oil groove 28 may be provided between the packing rings 26 and 27, but the passage 29 should be in the land closest to the packing ring 26 that is nearest the air chamber 12.

It will be noted that the novel sealing structure of the present invention is contained in a short member (the piston) that is relatively reciprocable with respect to a long smooth member (the cylinder).

Although for the purpose of explaining the invention, a particular embodiment thereof has been shown and described, obvious modifications will occur to a person skilled in the art, and we do not desire to be limited to the exact details shown and described.

We claim:

1. A sealing structure for a reciprocating mechanism comprising a first relatively short member exposed to a gas at one end and a lubricating liquid at the other end and a second elongated longitudinally smooth member, said members having complementary, cooperating, circumferentially continuous cylindrical bearing faces in sliding relation with each other, said sealing structure comprising: a plurality of longitudinally spaced transversely extending lands constituting said bearing face of said first member and defining at least three transverse grooves; resilient packing means in two nonadjacent grooves dimensioned to protrude therefrom and contact said bearing face of said second member in wiping relation; and said first member having a passage therein communicating said one end thereof with the bearing face thereof intermediate said packing means in said nonadjacent grooves, the end of said passage communicating with said bearing face terminating in an orifice in the bearing face spaced from said grooves whereby the only flow path from said groove to said passage is through the clearance between said complementary cooperating cylindrical bearing faces of said first and second members.

2. The combination of claim 1 in which the end of said passage communicating with said bearing face terminates in the face of the land on the liquid side of the packing nearest the gas end of said first member.

3. In a reciprocating mechanism comprising a relatively long cylinder member and a relatively short piston member reciprocable therein and dividing said cylinder member into oil and gas compartments, respectively, said members having complementary cooperating cylindrical bearing faces in sliding relation with each other, a sealing structure on said piston member comprising: a plurality of longitudinally spaced, transversely extending lands constituting said bearing face of said piston member and defining at least three transverse grooves; resilient packing means in two nonadjacent grooves dimensioned to protrude therefrom and contact said bearing face of said cylinder member in wiping relation; said piston member having a passage therein communicating the gas end thereof with the bearing face thereof intermediate said packing means in said nonadjacent grooves, the end of said passage communicating with said bearing face terminating in an orifice in the bearing face spaced from said grooves whereby the only flow path from said groove to said passage is through the clearance between said complementary cooperating cylindrical bearing faces of said piston and cylinder members.

4. Apparatus according to claim 3 in which said piston is a free piston movable in response to differential pressure between said air and oil chambers sufficient to overcome its frictional resistance.

References Cited in the file of this patent

UNITED STATES PATENTS

| | | |
|---|---|---|
| 1,258,471 | Schlaepfer et al. | Mar. 5, 1918 |
| 1,284,341 | Honegger | Nov. 12, 1918 |
| 2,064,969 | Carr et al. | Dec. 22, 1936 |
| 2,349,253 | Edmund | May 23, 1944 |
| 2,663,320 | Snyder | Dec. 22, 1953 |